US012661798B2

(12) United States Patent
Stein

(10) Patent No.: US 12,661,798 B2
(45) Date of Patent: Jun. 23, 2026

(54) IN-VEHICLE INTERFACE ARRANGEMENT FOR A HUMANOID ROBOT

(71) Applicant: DAIMLER TRUCK AG,
Leinfelden-Echterdingen (DE)

(72) Inventor: Fridtjof Stein, Ostfildern (DE)

(73) Assignee: DAIMLER TRUCK AG,
Leinfelden-Echterdingen (DE)

( * ) Notice: Subject to any disclaimer, the term of this patent is extended or adjusted under 35 U.S.C. 154(b) by 47 days.

(21) Appl. No.: 18/654,263

(22) Filed: May 3, 2024

(65) Prior Publication Data

US 2024/0367322 A1    Nov. 7, 2024

(30) Foreign Application Priority Data

May 4, 2023    (DE) ..................... 10 2023 111 659.2

(51) Int. Cl.
B25J 5/00      (2006.01)
B25J 9/16      (2006.01)
(52) U.S. Cl.
CPC ............. B25J 9/1689 (2013.01); B25J 5/007
(2013.01)
(58) Field of Classification Search
CPC ................................ B25J 9/1689; B25J 5/007
See application file for complete search history.

(56) References Cited

U.S. PATENT DOCUMENTS 9,164,508 B1 * 10/2015 Takach, Jr. ........... G05D 1/0011
10,562,432 B2    2/2020 Chelian 2016/0377508 A1* 12/2016 Perrone ................. G01M 17/06
180/204
2018/0029516 A1*  2/2018 Chelian ................. B60P 1/5404
2020/0050211 A1*  2/2020 Donnelly ........... B60H 1/00357

FOREIGN PATENT DOCUMENTS

CN      111924018 A      11/2020
DE    102008018556 A1    10/2009
DE    102009048491 A1     4/2011
DE    102018212174 A1 *   1/2020 ........... B25J 11/008
JP      2005088095 A      4/2005
WO      2016178213 A1    11/2016
WO      2017070426 A1     4/2017

OTHER PUBLICATIONS

Translation of DE102018212174A1. Kiesewetter, Thomas. Retrofit kit for a vehicle and vehicle system. Jan. 23, 2020 (Year: 2020).*
Examination Report created Feb. 29, 2024 in related/corresponding DE Application No. 10 2023 111 659.2.

* cited by examiner

*Primary Examiner* — Khoi H Tran
*Assistant Examiner* — Tien Minh Le
(74) *Attorney, Agent, or Firm* — PATENT PORTFOLIO BUILDERS PLLC

(57)                ABSTRACT

An interface arrangement for a vehicle connects a humanoid robot to the vehicle. The interface arrangement is equipped and designed to be connected in the vehicle, respectively to a positioning device, an energy source, a communication device, and a sensor unit of the vehicle. The interface arrangement has a first interface equipped and designed to transmit current position data of the positioning device of the vehicle to the humanoid robot. A second interface transmits energy from the energy source of the vehicle to the humanoid robot. A third interface transmits network data from the communication device of the vehicle to the humanoid robot. A fourth interface transmits sensor data from the sensor unit of the vehicle to the humanoid robot.

8 Claims, 1 Drawing Sheet

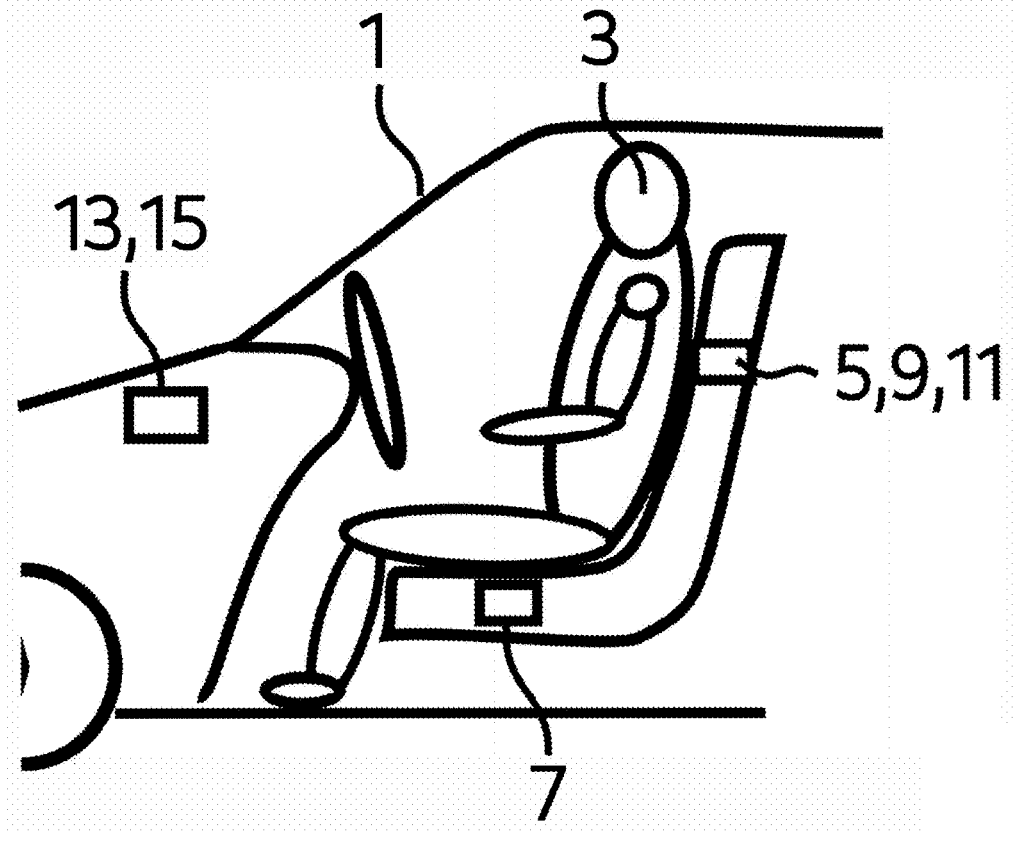

IN-VEHICLE INTERFACE ARRANGEMENT FOR A HUMANOID ROBOT

CROSS-REFERENCE TO RELATED APPLICATIONS

This application claims priority under 35 U.S.C. § 119 to German patent application 10 2023 111 659.2, filed May 4, 2023, the entire disclosure of which is herein expressly incorporated by reference.

BACKGROUND AND SUMMARY OF THE INVENTION

Exemplary embodiments of the invention relate to an interface arrangement for a vehicle for connecting a humanoid robot to a vehicle, and to a vehicle having such an interface arrangement.

Humanoid robots are automatons that are based on human anatomy in their degree of kinematic freedom and shape and size. The motivation behind such a design lies, on the one hand, in the same evolutionary reasons as have led to the structure of the human body, specifically having the possibility of carrying or manipulating objects by means of two arms and hands while also having the possibility of onward movement via legs. In addition, the basis of the structure of the human body offers the possibility of using such humanoid robots in an environment, created by humans for humans. This relates, for example, to the accessibility of premises and vehicles, which are adapted to the proportions of humans (for example the concept of steps), but also to the size and mass of objects that can be handled by humans, such as packages for packing goods, or human-machine interfaces, such as those of vehicles. In the prior art, it is already known to configure humanoid robots such that they can also sit in the driver's seat of a passenger car or HGV, and can take over the vehicle guidance of this vehicle.

For this purpose, WO 2016/178213 A1 relates to a robot system for driving a vehicle to a destination, wherein the robot system is configured for placement in the vehicle, and comprises: an imaging system, which is configured and can be operated such that it records image data of at least a part of the vehicle interior and image data of the exterior environment of the vehicle; and a control system, which is configured and can be operated to process and to analyze the image data recorded by the imaging system, and to identify image data of the vehicle status indicator in the image data of at least a part of the vehicle interior, and from the latter to determine at least vehicle status data, and from the image data of the external environment to determine road status data, and to analyze at least this vehicle status data and the road status data to generate control instructions for driving the vehicle along the road.

CN 111924018 A relates in particular to a robot driver, which is designed as a humanoid robot, consisting of: a head assembly, a neck and upper body assembly, a hand assembly, a bottom assembly, a leg and foot assembly, a sensor system assembly, a control system assembly, and a power supply assembly; artificial intelligence and Internet-of-Things technology is used here to implement the majority of functions of the intelligent automated driving, to solve the problem of tiring in long-distance driving with a driver, to solve the problem of the family having a full-time "driver", without paying a wage, and to simplify the work of freight stations, harbors, airports, tourist areas, and road motorway patrol vehicles.

WO 2017/070426 A1 further relates to a vehicle, a robot, and a controller. The vehicle can comprise an accelerator actuator and a steering actuator. The robot can be configured as an accelerator actuator to operate the accelerator operator, and can comprise a steering actuator, which is configured to operate the steering operator. The controller is configured such that it sends a first signal to the accelerator actuator as a reaction to an accelerator command to operate the accelerator operator of the vehicle, and sends a second signal to the steering actuator as a reaction to a steering command to steer the vehicle.

Because it can be assumed that humanoid robots can increasingly take over work meant for humans, and thus simplify the world of work, and, in some circumstances, that humanoid robots can also take over everyday tasks in households, guiding vehicles can also belong to the increasing tasks of humanoid robots.

Exemplary embodiments of the invention accordingly are directed to simplifying the vehicle guidance of a vehicle by a humanoid robot.

A first aspect of the invention relates to an interface arrangement for a vehicle for connecting a humanoid robot to the vehicle, wherein the interface arrangement is equipped and designed to be connected, in particular in the source/in the vehicle, respectively to a positioning device, an energy source, a communication device, and a sensor unit of the vehicle, and wherein the interface arrangement, in particular in the robot connection, has: a first interface equipped and designed to transmit current position data of the positioning device of the vehicle to the humanoid robot, a second interface for transmitting energy from the energy source of the vehicle to the humanoid robot, a third interface for transmitting network data from the communication device of the vehicle to the humanoid robot, and a fourth interface for transmitting sensor data from the sensor unit of the vehicle to the humanoid robot.

The expression "in the source" means that the interface arrangement is here provided with the original data of the vehicle and an energy current, in particular from an energy source and from a sensor unit/communication device of the vehicle as data sources; in other words, "in the source" means in the vehicle, and is the opposite of in the receiver, also in the connection or in the robot.

Because the humanoid robot takes the place of a human driver for the purpose of automatic vehicle guidance, marginal conditions and requirements apply to the humanoid robot much like those to which humans are subject, or those which apply to humans. Safe perception is necessary for successful and safe vehicle guidance to be able to estimate the current position of one's own vehicle compared with surrounding road traffic and other road users, and to be able to analyze the behavior of other road users in relation to one's own behavior. Keeping within lanes is part of this task. In principle, communication with other road users is also within the scope of the task, and knowledge of the current position of the vehicle in a road traffic network is part of navigation and route guidance. A humanoid robot also requires energy throughout the duration of its operation.

The first, second, third and fourth interface ensure that the humanoid robot is equipped with all these requirements, and is fed sufficient data and energy to be able to successfully take over the vehicle guidance of the vehicle. A standardized interface arrangement is thus advantageously suggested, such that a humanoid robot can sit in a driver's seat of vehicles that are principally manually tangible, and can automatically carry out the vehicle guidance. This advantageously increases the applicability and range of a humanoid robot in the commercial and in the private sector, because it can be used not only locally within range of its legs, but can, for example, drive to another place by using a vehicle, for example in order to deliver packages there, to carry out dangerous work, to go to a workshop for its own mainte- nance, or the like.

The first, second, third and fourth interface can be designed according to corresponding wired standards, for example an electrical contact plug can be used for energy supply via the second interface, which is for example connected to the 12 V low-voltage network of the vehicle, or alternatively to the high-voltage network of an electric vehicle. A wireless energy transfer via an inductive charging interface to a battery of the humanoid robot is also possible. The first, third and fourth interface are, in particular, data interfaces here for transmitting information from the vehicle to the humanoid robot. Such data can be transmitted via cable (Ethernet, CAN, USB, etc.), but also wirelessly, for example via the 5G or 6G standard.

While the humanoid robot itself can typically be equipped at least at head height with powerful sensors, for example can have 3D TOF (abbreviation for "time of flight") cameras and microphones and acceleration sensors, which in prin- ciple themselves make a vehicle guidance possible, sensors of the vehicle itself specifically developed and designed for the vehicle can be accessed by data transmission via the fourth interface, for example lidar, ultrasound, stereo cam- era, radar sensors, and other sensors installed in the vehicle, and can thus significantly simplify the vehicle guidance of the vehicle. The humanoid robot is advantageously equipped with corresponding software, which for this purpose is preferably specific to the present type of vehicle, to be able to completely take over vehicle guidance, in particular by operating the regular operating elements of a vehicle, such as a steering wheel, accelerator, brake pedal (and in the case of manually switched transmissions a clutch pedal and a gear lever), and by operating human-machine interfaces for subsystems of the vehicle, such as lights, windscreen wipers, entertainment systems, air conditioning, etc.

The first interface of the interface arrangement serves, in particular, to transmit a current position of the vehicle determined by the positioning device to the humanoid robot, in particular to be able to implement a route guidance of the journey of the vehicle. Preferably, an absolute position of the vehicle is, for example, kept in WGS-84 coordinates as a result of the positioning device.

The third interface of the interface arrangement serves, in particular, to provide a communication interface between the vehicle with the humanoid robot and the outside world. The third interface thus serves in particular to guarantee an internet connection, a car-2-X connection, or the like.

It is thus an advantageous effect of the invention that the vehicle guidance of a vehicle that can be operated manually is significantly simplified by a humanoid robot, because the latter can be supplied with sufficient data of high quality and with energy by producing only one connection between the humanoid robot and the interface arrangement of the vehicle. Such an interface connection can be produced by a plug-socket connection, or wirelessly, or by a mixture of the different interfaces. If the quality of the control of the humanoid robot is sufficient, the humanoid robot can addi- tionally replace an autonomous vehicle having an integrated automatic driving control system, and thus can operate vehicles originally designed for manual operation in an automated manner.

According to an advantageous embodiment, at least two of the group: "first interface, second interface, third inter- face, fourth interface" are logical interfaces, which use a shared physical transmission element.

The physical interface also includes a wireless interface. Thus, several of a first interface, second interface, third interface, fourth interface can run and correspondingly be implemented via a shared cable as part of a physical inter- face, and different cables or wireless channels can also be implemented.

According to a further advantageous embodiment, the interface arrangement further has an initialization module, which is designed to communicate with the humanoid robot, at the beginning of a connection between the humanoid robot and the interface arrangement of the vehicle, which data and/or via which protocol data should be transmitted from the vehicle to the humanoid robot via the interface arrangement.

According to a further advantageous embodiment, the interface arrangement further has: a fifth interface, equipped and designed to transmit driving control commands from the humanoid robot to an automated driving control system of the vehicle.

The fifth interface makes it possible for the humanoid robot not to have to operate the pedals and the steering wheel, and instead only to transmit commands to the vehicle itself, while the vehicle implements the commands, and the commands are carried out with the actuators of the vehicle.

According to a further advantageous embodiment, the interface arrangement further has a control module, which is designed to allow a vehicle guidance of the humanoid robot via the fifth interface depending on an authorization char- acteristic stored in the humanoid robot, or to allow only a vehicle guidance by the humanoid robot via manual control elements of the vehicle such as a steering wheel and an accelerator.

According to a further advantageous embodiment, the control module is designed, if the connection between the humanoid robot and the vehicle is incomplete due to a lack of a data link at least one of the group "first interface, second interface, third interface, fourth interface" to limit a range of the journey of the vehicle undergoing vehicle guidance by the humanoid robot and/or to limit a maximum speed during the journey of the vehicle undergoing vehicle guidance by the humanoid robot.

According to a further advantageous embodiment, the second interface for transmitting energy is an inductive interface for wirelessly transmitting electrical energy from the vehicle to the humanoid robot by induction.

According to a further advantageous embodiment, the first interface, third interface and fourth interface are designed as wireless radio interfaces.

A further aspect of the invention relates to a vehicle having an interface arrangement as described above and in the following.

According to a further advantageous embodiment, the vehicle further has an output interface for transmitting information to further road users, if vehicle guidance by the humanoid robot is currently taking place.

In particular, when a lifelike humanoid robot has taken up a place controlling a vehicle, the impression of a human driver of the vehicle could arise for further road users. However, because human drivers and robotic drivers can differ significantly in their behavior, it can be relevant information for further road users whether a driver control- ling the vehicle is a human person or a humanoid robot. The output interface is thus preferably designed as a visual output unit, if it is directed at further human road users, the visual output unit, for example, being in the form of lighting or a lit symbol of the vehicle. A car-2-x interface of the vehicle can also be used for further automated road users, such as further autonomous vehicles, to transmit this information to the further automated road users via a data link.

Advantages and preferred developments of the proposed vehicle result via an analogous and corresponding transfer of the explanations given above in the context of the proposed interface arrangement.

Further advantages, features and details result from the following description in which—optionally with reference to the drawing—at least one exemplary embodiment is described in detail. Like, similar and/or functionally like parts are provided with the same reference numerals.

BRIEF DESCRIPTION OF THE SOLE DRAWING

The sole FIGURE illustrates an interface arrangement for a vehicle for connecting a humanoid robot to the vehicle according to an exemplary embodiment of the invention.

The depictions in the FIGURE are schematic and not to scale.

DETAILED DESCRIPTION

The sole FIGURE shows a detail of a vehicle 1 from a side view, having an interface arrangement for connecting a humanoid robot 3 to the vehicle 1. The interface arrangement is connected in the source to a positioning device of the vehicle for determining a respective current position of the vehicle 1, and to an electrical energy source, and to a communication device for producing a car-to-car connection for communication with other, automated road users. The interface arrangement is further connected in the source to several sensor units of the vehicle 1. The sensor units comprise cameras of the vehicle 1 for an exterior region in the environment of the vehicle 1, interior cameras, lidar systems of the vehicle 1, and microphones in the interior and on the exterior of the vehicle 1, to make the vehicle's own sensors available as a perception interface for the humanoid robot 3. Based on the energy transmitted from the vehicle 1 and based on the sensor and communication data of the vehicle 1 made available, the humanoid robot 3 is in a position to drive the vehicle 1 like a human driver.

The sensor data of the vehicle 1 is additionally combined with own sensor data in the humanoid robot 3, at least with a haptic response of the steering wheel of the vehicle 1, to make driving over objects and obstacles detectable to the humanoid robot 3. On the connection side, i.e., on a side to which the humanoid robot 3 can be connected, the interface arrangement further has: a first interface 5 equipped and designed to transmit current position data of the positioning device of the vehicle 1 to the humanoid robot 3, a second interface 7 for transmitting energy from the energy source of the vehicle 1 to the humanoid robot 3, a third interface 9 for transmitting network data from the communication device of the vehicle 1 to the humanoid robot 3, and a fourth interface 11 for transmitting sensor data from the sensor unit of the vehicle 1 to the humanoid robot 3. The second interface 7 serves to electrically transmit energy in the form of inductive charging of the humanoid robot 3. The second interface 7 is arranged under the driver's seat, so as not to disturb the main computers at chest height of the humanoid robot 3 unnecessarily via the electrical fields. The further interfaces 5, 9, 11 are arranged in the backrest, and can send their information to a corresponding radio receiver of the humanoid robot 3 via wireless communication, preferably via a UDP protocol. Further interface arrangements, such as those described above, can be provided in the vehicle 1 to transport further humanoid robots 3 as passengers in the vehicle 1, which can profit at least from an energy supply of the vehicle 1, for example to be able to charge their own batteries.

The humanoid robot 3 in the function of the vehicle driver at least has a plurality of limbs connected to each other by joints. The respective joints can be controlled by electrical actuators, whereby a force or a torque can be applied to the environment of the humanoid robot 3 by each of the joints or each of the limbs. Due to this generation of force and generation of torque of the humanoid robot 3, the humanoid robot 3 is in the position to operate the pedals of the vehicle 1 and to be able to rotate the steering wheel of the vehicle, and to be able to operate further switches, levers and touch-sensitive screens or gesture-sensitive control zones of the vehicle 1.

An initialization module 13, which transmits and receives wirelessly, further serves to communicate with the humanoid robot 3, at the beginning of a connection between the humanoid robot 3 and the interface arrangement, which data and/or via which protocol data should be transmitted from the vehicle 1 to the humanoid robot 3 via the interface arrangement. A control module 15, which is likewise wireless, also serves to allow a vehicle guidance of the humanoid robot 3 via a wireless fifth interface depending on a certificate-certified authorization characteristic stored in the humanoid robot 3, or to allow only a vehicle guidance by the humanoid robot 3 via manual control elements of the vehicle 1 such as a steering wheel and an accelerator.

Although the invention has been illustrated and explained in more detail by preferred exemplary embodiments, the invention is not limited by the disclosed examples, and other variations can be derived from them by the person skilled in the art without departing from the scope of protection of the invention. It is thus clear that many possible variations exist. It is also clear that embodiments specified in an exemplary form really only depict examples which cannot be understood as limiting the scope of protection, the possible applications or the configuration of the invention in any way. Rather, the preceding description and the description of FIGURES put the person skilled in the art in a position to concretely implement the exemplary embodiments, wherein the person skilled in the art can undertake numerous changes in the knowledge of the disclosed inventive concept, for example with regard to the function or the arrangement of individual elements specified in an exemplary embodiment, without departing from the scope of protection, which is defined by the claims and their legal equivalents, e.g., more detailed explanations in the description.

LIST OF REFERENCE NUMERALS 1 vehicle
3 humanoid robot
5 first interface
7 second interface
9 third interface
11 fourth interface
13 initialization module
15 control module

What is claimed is:

1. An interface arrangement for a vehicle to connect a humanoid robot to the vehicle, wherein the interface arrangement comprises:

a first interface configured to transmit current position data of a positioning device of the vehicle to the humanoid robot;

a second interface configured to transmit energy from an energy source of the vehicle to the humanoid robot;

a third interface configured to transmit network data from a communication device of the vehicle to the humanoid robot; and a fourth interface configured to transmit sensor data from a sensor unit of the vehicle to the humanoid robot, wherein the first, third, and fourth interfaces are wireless interfaces configured to use a shared physical transmission element and are arranged in a backrest of a seat of the vehicle, and wherein the second interface is an inductive wireless interface configured to wirelessly transmit energy to the humanoid robot and is arranged under the seat of the vehicle.

2. The interface arrangement of claim 1, further comprising:

an initialization module configured to communicate with the humanoid robot, at a beginning of a connection between the humanoid robot and the interface arrangement of the vehicle, data or via which protocol data should be transmitted from the vehicle to the humanoid robot via the interface arrangement.

3. The interface arrangement of claim 1, further comprising:

a fifth interface configured to transmit driving control commands from the humanoid robot to an automated driving control system of the vehicle.

4. The interface arrangement of claim 3, wherein a certificate-certified authorization stored in the humanoid robot allows only one of the following:

a vehicle guidance of the humanoid robot via the fifth interface depending on an authorization characteristic stored in the humanoid robot, and only a vehicle guidance by the humanoid robot via manual control elements of the vehicle, the interface arrangement further comprising a control module configured to control how the humanoid robot operates the vehicle based on the certificate-certified authorization stored in the humanoid robot.

5. The interface arrangement of claim 4, wherein the control module is configured to limit a range of a journey of the vehicle undergoing vehicle guidance by the humanoid robot or to limit a maximum speed during the journey of the vehicle undergoing vehicle guidance by the humanoid robot responsive to a connection between the humanoid robot and the vehicle being incomplete due to a lack of a data link at least one of the first interface, the second interface, the third interface, and the fourth interface.

6. The interface arrangement of claim 1, wherein the second interface is an inductive interface configured to wirelessly transmit electrical energy from the vehicle to the humanoid robot by induction.

7. A vehicle comprising:

a vehicle seat having a backrest; and an interface arrangement configured to connect a humanoid robot to the vehicle, wherein the interface arrangement comprises a first interface configured to transmit current position data of a positioning device of the vehicle to the humanoid robot;

a second interface configured to transmit energy from an energy source of the vehicle to the humanoid robot;

a third interface configured to transmit network data from a communication device of the vehicle to the humanoid robot; and a fourth interface configured to transmit sensor data from a sensor unit of the vehicle to the humanoid robot, wherein the first, third, and fourth interfaces are wireless interfaces configured to use a shared physical transmission element and are arranged in a backrest of a seat of the vehicle, and wherein the second interface is an inductive wireless interface configured to wirelessly transmit energy to the humanoid robot and is arranged under the seat of the vehicle.

8. The vehicle of claim 7, further comprising:

an output interface configured to transmit information to further road users when the vehicle is currently being guided by the humanoid robot.

* * * * *